United States Patent
Kobayashi et al.

(10) Patent No.: US 8,516,705 B2
(45) Date of Patent: Aug. 27, 2013

(54) METHOD OF MANUFACTURING BEARING RING MEMBER FOR ROLLING BEARING UNIT

(75) Inventors: Kazuto Kobayashi, Kanagawa (JP); Hiroshi Koyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 611 days.

(21) Appl. No.: 12/674,512

(22) PCT Filed: Oct. 2, 2008

(86) PCT No.: PCT/JP2008/067930
§ 371 (c)(1), (2), (4) Date: Feb. 22, 2010

(87) PCT Pub. No.: WO2009/044809
PCT Pub. Date: Apr. 9, 2009

(65) Prior Publication Data
US 2011/0099813 A1  May 5, 2011

(30) Foreign Application Priority Data
Oct. 2, 2007  (JP) .................. 2007-258632

(51) Int. Cl.
*B21D 53/10* (2006.01)
*F16C 33/58* (2006.01)

(52) U.S. Cl.
USPC ............ 29/898.04; 29/898.066; 384/513; 384/544

(58) Field of Classification Search
USPC ........ 29/898.04, 898.048, 898.066; 384/513, 384/544
See application file for complete search history.

(56) References Cited

U.S. PATENT DOCUMENTS

| | | | |
|---|---|---|---|
| 4,189,816 A | 2/1980 | Chalansonnet | |
| 5,882,123 A | 3/1999 | Lee et al. | |
| 7,104,695 B2 * | 9/2006 | Shevket | 384/450 |
| 7,534,049 B2 * | 5/2009 | Ohtsuki et al. | 384/544 |
| 7,862,242 B2 * | 1/2011 | Ohtsuki | 384/544 |
| 2007/0065065 A1 | 3/2007 | Ohtsuki et al. | |
| 2008/0205811 A1 * | 8/2008 | Komori et al. | 384/544 |
| 2009/0148091 A1 * | 6/2009 | Kametaka et al. | 384/544 |

FOREIGN PATENT DOCUMENTS

| | | |
|---|---|---|
| DE | 2745527 A1 | 4/1978 |
| DE | 69820883 T2 | 12/2004 |
| DE | 112004001656 T5 | 8/2006 |
| EP | 1647418 A2 | 4/2006 |
| JP | 2003-232343 A | 8/2003 |
| JP | 2004-108449 A | 4/2004 |
| JP | 2004-345439 A | 12/2004 |

(Continued)

OTHER PUBLICATIONS

German Office Action dated Jul. 1, 2011 issued in a counterpart application No. 112008002291.7.

(Continued)

*Primary Examiner* — Alexander P Taousakis
(74) *Attorney, Agent, or Firm* — Sughrue Mion, PLLC

(57) ABSTRACT

A method for manufacturing a bearing ring member for a rolling bearing unit is provided. In this method, a blank hollow cylindrical portion having a smaller diameter than a hollow cylindrical portion is formed, the blank hollow cylindrical portion is radially expanded to form the hollow cylindrical portion, and a raceway surface is formed on either inner or outer circumferential surface of the hollow cylindrical portion along a circumferential direction thereof.

5 Claims, 7 Drawing Sheets

(56) References Cited

FOREIGN PATENT DOCUMENTS

| | | |
|---|---|---|
| JP | 2006-017365 A | 1/2006 |
| JP | 2006-111070 A | 4/2006 |
| JP | 2006-137365 A | 6/2006 |
| JP | 2006-177466 A | 7/2006 |
| JP | 2006-220221 A | 8/2006 |
| JP | 2006-289412 A | 10/2006 |
| JP | 2007-152413 A | 6/2007 |
| JP | 2007-292116 A | 11/2007 |
| JP | 2008-126286 A | 6/2008 |
| JP | 2008-173677 A | 7/2008 |
| WO | 2005/065007 A2 | 7/2005 |

OTHER PUBLICATIONS

International Search Report [PCT/ISA/210] dated Jan. 6, 2009 for PCT/JP2008/067930, 2 pages.

* cited by examiner

US 8,516,705 B2

METHOD OF MANUFACTURING BEARING RING MEMBER FOR ROLLING BEARING UNIT

TECHNICAL FIELD

The present invention relates to a method of manufacturing a bearing ring member for various types of rolling bearing units by plastically deforming a metallic material such as carbon steel. The bearing ring member includes a hollow cylindrical portion partially in an axial direction thereof, and a raceway surface is provided along the entire circumference of either inner or outer circumferential surface of the hollow cylindrical portion.

BACKGROUND ART

A wheel and a braking rotary member of a motor vehicle are supported by a rolling bearing unit so as to be rotatable with respect to a suspension system. During the cornering of the motor vehicle, a wheel supporting rolling bearing unit like this is subjected to a large moment. Therefore, in order to ensure stability during the cornering, a rolling bearing unit having high moment rigidity is required. To this end, wheel supporting rolling bearing units generally adopt a configuration in which rolling elements are arranged in double rows, and in which a preload and contact angles of a back-to-back arranging type are given to the double rows of rolling elements respectively. Further, in recent years, with a view to ensuring higher moment rigidity while keeping a rolling bearing unit from becoming oversized, there is proposed a configuration in which pitch circle diameters or rolling element diameters are made different between the double rows rolling elements (see, e.g., JP 2003-232343 A, JP 2004-108449 A, JP 2004-345439 A, JP 2006-17365 A, and International Publication WO2005/065007).

FIG. 5 shows a wheel supporting rolling bearing unit 1 described in JP 2006-137365 A. This rolling bearing unit 1 includes a hub 2, an outer ring 3, and a plurality of balls (rolling elements) which are arranged in double rows. The hub 2 includes a hub body 5 and an inner ring 6. The hub 2 is formed with a mounting flange 7 on an axially outer end portion of an outer circumferential surface to support a wheel and a braking rotary member, and double rows of inner ring raceways 8a, 8b on an axially intermediate portion and on an axially inner end portion of the outer circumferential surface, respectively. In the following description, being outer with respect to the axial direction means being on an outer side in a widthwise direction of a vehicle when the rolling bearing unit is installed in the vehicle, which is a left side in FIGS. 5 and 6. Being inner with respect to the axial direction means being on a right side in FIGS. 5 and 6, which is a center side in the widthwise direction of the vehicle. A diameter of the inner ring raceway 8a of the axially outer row is larger than a diameter of the inner ring raceway 8b of the axially inner row. For the purpose of supporting and fixing the braking rotary member, such as a disk, or the wheel to the mounting flange 7, base end portions of a plurality of studs 9 are fixed to the mounting flange 7.

In order to make the diameters of the inner ring raceways 8a, 8b different, an outer circumferential sloping stepped portion 10 is formed on an outer circumferential surface of an axially intermediate portion of the hub body 5 at a portion which is slightly inward in the axial direction from the inner ring raceway 8a of the outer row, so as to be sloped in a direction in which its outside diameter decreases as it extends axially inward. On an axially inner end portion of the hub body 5, which is further inward in the axial direction than the outer circumferential sloping stepped portion 10, a small diameter stepped portion 11 is formed. On this small diameter stepped portion 11, an inner ring 6 having an outer circumferential surface on which the inner ring raceway 8b of the inner row is formed is fitted. This inner ring 6 is pressed against a stepped surface 13 at an axially outer end portion of the small diameter stepped portion 11 by a rivet portion 12, which is formed at an axially inner end of the hub body 5, and is joined to the hub body 5 in a fastened manner. The inner ring raceways 8a, 8b have an arcuate cross-sectional shape (a generatrix shape), respectively, such that the respective outside diameters decrease as they become close to each other, i.e., as they extend towards the center of the hub 2 in the axial direction.

The outer ring 3 is formed with double rows of outer ring raceways 14a, 14b on an inner circumferential surface thereof and a coupling flange 15 on an inner circumferential surface thereof for being coupled to the suspension system in a fastened manner. A diameter of the outer ring raceway 14a of the axially outer row is larger than a diameter of the outer ring raceway 14b of the axially inner row. Thus, on an inner circumferential surface of an axially intermediate portion of the outer ring 3 at a portion which is slightly inward in the axial direction from the outer ring raceway 14a of the outer row, an inner circumferential sloping stepped portion 16 is formed so as to be sloped in a direction in which its inside diameter decreases as it extends axially inward. The outer ring raceways 14a, 14b have an arcuate cross-sectional shape (a generatrix shape), respectively, such that the respective inside diameters decrease as they become close to each other, i.e., as they extend towards the center of the hub 2 in the axial direction.

The double rows of a plurality of the balls 4 are rollably arranged between the inner ring raceways 8a, 8b and the outer ring raceways 14a, 14b. In this arrangement, a preload and contact angles of a back-to-back arranging type (a DB type) are given to the double rows of balls 4, respectively. Pitch circle diameters of the balls 4 in the respective rows are different from each other in accordance with a difference in diameters between the inner ring raceways 8a, 8b and a difference in diameters between the outer ring raceways 14a, 14b. That is, a pitch circle diameter $PCD_{out}$ of the balls 4 in the axially outer row is larger than a pitch circle diameter $PCD_{in}$ of the balls 4 in the axially inner row ($PCD_{out} > PCD_{in}$).

According to the configuration described above, the moment rigidity is increased in accordance with the increase of the pitch circle diameter $PCD_{out}$ of the outer row. Therefore, it becomes easier to design for improving running stability during the cornering and for improving durability of the wheel supporting rolling bearing unit. On the other hand, because the pitch circle diameter $PCD_{in}$ of the inner row does not have to be increased, the running stability and the durability can be improved without specially increasing a diameter of a portion (e.g., a knuckle mounting hole) of the suspension system.

In the configuration described above and shown in FIG. 5, the diameters of the balls 4 arranged in the double rows are the same. On the other hand, as shown in FIG. 6, there is proposed a wheel supporting rolling bearing unit 1a in which a diameter of balls 4a in an outer row is smaller than a diameter of balls 4b in an inner row. In this case, the number of balls 4a in the outer row is made greater than the number of balls 4b in the inner row so as to increase rigidity of the outer row than rigidity of the inner row. Further, while the balls 4 (4a, 4b) are used as rolling elements in the examples of FIGS. 5 and 6, tapered rollers may be used as rolling elements in a rolling bearing unit for heavyweight vehicles.

When manufacturing the outer ring 3 of the rolling bearing units 1, 1a described above, as in the case of an outer ring of a rolling bearing unit in which pitch circle diameters of rolling elements in inner and outer rows are the same, a hot forging process may be carried out on a stock 17 of an iron alloy, such as a medium-carbon steel, in the steps (A) to (F) shown in FIG. 7. That is, an intermediate work is produced by carrying out a plastic forming on the stock 17 so as to have a slightly larger size than an external shape of the outer ring 3, and a shaping, such as a turning, and a finishing, such as a grinding, are carried out on the intermediate work. By carrying out the plastic forming, such as the hot forging, prior to the shaping and the finishing, the metallic structure of the outer ring 3 is densified, whereby the strength of the outer ring 3 is improved. Further, the cutting amount of the material is reduced, whereby cost reduction can be realized as a result of improved yield rate of the material and shortened machining time.

In the manufacturing method described above, firstly, an elongated material is cut into a certain length to form a solid solid cylindrical stock 17 shown in (A) of FIG. 7. Next, an upset process is carried out in which the stock 17 is flattened in an axial direction to expand a diameter thereof, whereby a primary intermediate work 18 having a beer barrel shape as shown in (B) of FIG. 7 is formed.

Subsequently, a rough forming is carried out in which the primary intermediate work 18 is plastically deformed in a mold unit having a punch and a counter punch, whereby a preliminary secondary intermediate work 19 is formed. The preliminary secondary intermediate work 19 has a cylindrical wall 20 and a partitioning portion 21 which closes an inside of the cylindrical wall 20 at an axially intermediate portion. On an outer circumferential surface of the axially intermediate portion of the cylindrical wall 20, a blank flange portion 22, which becomes a coupling flange 15 (see FIGS. 5 and 6), is formed.

Through a finishing forming process in which the preliminary secondary intermediate work 19 is plastically deformed in another mold unit having a different punch and a counter punch, a subsequent preliminary secondary intermediate work 23 as shown in (D) of FIG. 7 is formed. In the step of processing the preliminary secondary intermediate work 19 into the subsequent preliminary secondary intermediate work 23, an overall shape is arranged by reducing thicknesses of the partitioning portion 21 and the blank flange portion 22. On an outer circumferential edge of a secondary blank flange portion 24 of the subsequent preliminary secondary intermediate work 23 obtained by the finish forming, a burr 25 is formed as a result of the residual material. Thus, the burr 25 is removed to obtain a secondary intermediate work 26 as shown in (E) of FIG. 7.

A punching is carried out on the secondary intermediate work 26 to remove the partitioning portion 21, whereby a tertiary intermediate work 27 shown in (F) of FIG. 7 is obtained.

Further, the outer ring raceways 14a, 14b are formed in double rows on inner circumferential surface of the cylindrical wall 20 of the tertiary intermediate work 27 at two locations in the axial direction by turning and grinding, whereby the outer ring 3 is having the double rows of outer ring raceways 14a, 14b and the coupling flange 15 is obtained.

In the case of manufacturing the outer ring 3 in the way described above, flexibility in setting the positions and diameters of double rows of outer ring raceways is low for the following reasons.

The hot forging in (B) to (C) of FIG. 7, which is the plastic forming, is called a forward-backward extrusion, in which the respective end surfaces of the heated primary intermediate work 18 is strongly pressed between the punch and the counter punch which are concentrically disposed inside the die. By this pressing operation, a part of the primary intermediate work 18 is extruded forward in a punch push-in direction (a forward extrusion), and at the same time, the remaining part of the primary intermediate work 18 is extruded rearward in the punch push-in direction (a backward extrusion).

A load (deformation resistance) required for the forward extrusion is larger than a load required for the backward extrusion. That is, in the forward extrusion which is carried out in the process of (B) to (C) in FIG. 7, a metal material squashed between the punch and the counter punch is moved into an annular space between an inner circumferential surface of the die which lies further forward in push-in direction than the punch and an outer circumferential surface of the counter punch. A resistance against the deformation of the primary intermediate work 18, which is made of an iron alloy such as medium-carbon steel, is still quite large in the heating level for the hot forging. Therefore, the position of the partitioning portion 21 in the axial direction is required to be set in a range that enables the forward extrusion. On the other hand, the positions of the pair of outer ring raceways formed on the inner circumferential surface of the completed outer ring 3 are positions which interpose the partitioning portion 21 from respective sides in the axial direction. In other words, an amount to be processed by the forward extrusion is determined depending on the positions of arranging the outer ring raceways.

Under such conditions, it is difficult to manufacture the outer ring 3, in which diameters of the pair of outer ring raceways 14a, 14b are different from each other, at low cost. That is, once the tertiary intermediate work 27 shown in (F) of FIG. 7 is produced, the diameters of the pair of outer ring raceways are almost fixed. That is, the diameters of the outer ring raceways become larger than inside diameters of portions of the tertiary intermediate work 27 where the outer ring raceways are to be formed, by an amount to be cut in the finishing process such as turning and grinding. Further, in order to make a difference in the diameters of the outer ring raceways larger than the difference in the inside diameters of the portions of the tertiary intermediate work 27 where the outer ring raceways are to be formed, a cutting amount in forming one of the outer ring raceways needs to be larger than a cutting amount in forming the other of the outer ring raceways. Making the diameters of the outer ring raceways different in the way described above not only extends the machining time but also deteriorates the yield rate of the material, causing an increase in the manufacturing cost of the outer ring 3. Further, in the manufacturing method described above, the amount to be processed by the forward extrusion necessarily becomes large to some extent, and more time has to be spent in carrying out the process of (B) to (C) in FIG. 7 accordingly. Thus, in this respect also, the machining time is extended, and the manufacturing cost of the outer ring 3 is increased.

DISCLOSURE OF THE INVENTION

It is an object of the present invention to provide a method of manufacturing a bearing ring member for a rolling bearing unit with a good yield rate of material and in a short machining time, so as to reduce manufacturing cost of the bearing ring member.

According to a first aspect of the present invention, a method of manufacturing a bearing ring member for a rolling bearing unit is provided. In this method, a blank hollow cylindrical portion having a smaller diameter than a hollow cylindrical portion is formed, the blank hollow cylindrical portion is radially expanded to form the hollow cylindrical portion, and a raceway surface is formed on either inner or outer circumferential surface of the hollow cylindrical portion along a circumferential direction thereof.

According to a second aspect of the present invention, the bearing ring member is an outer ring of a double-row angular contact rolling bearing unit having double rows of raceway surfaces on an inner circumferential surface thereof, and one of the double rows of raceway surfaces is formed on the inner circumferential surface of the hollow cylindrical portion.

According to a third aspect of the present invention, the outer ring includes a coupling flange which outwardly protrudes from an axially intermediate portion of an outer circumferential surface thereof. The coupling flange is positioned between the double rows of raceway surfaces in an axial direction. Inside diameters of the double rows of raceway surfaces are different from each other, and the raceway surface having the larger inside diameter is formed on the inner circumferential surface of the hollow cylindrical portion.

According to a fourth aspect of the present invention, a barrel-shaped primary intermediate work is formed by flattening a cylindrical stock in an axial direction, a secondary intermediate work having a cylindrical wall, a partitioning portion which closes an inside of the cylindrical wall at a portion in the axial portion, and a coupling flange provided at an axially intermediate portion of an outer circumferential surface of the cylindrical wall, is formed by plastically deforming the primary intermediate work inside a mold unit having a punch and a counter punch, and a tertiary intermediate work is formed by removing the partitioning portion from the secondary intermediate work. The blank hollow cylindrical portion is a part of the tertiary intermediate work which lies on one side of the coupling flange in the axial direction.

According to a fifth aspect of the present invention, the partitioning portion is formed inside an axial end portion of the secondary intermediate work, and the blank hollow cylindrical portion includes a portion of the tertiary intermediate work from which the partitioning portion is removed.

According to a sixth aspect of the present invention, the radially expanding the blank hollow cylindrical portion includes pushing a punch into the blank hollow cylindrical portion.

According to a seventh aspect of the present invention, the radially expanding the blank hollow cylindrical portion includes pressing a roller against the inner circumferential surface of the blank hollow cylindrical portion, and moving a contact portion between the inner circumferential surface of the blank hollow cylindrical portion and the roller in the circumferential direction of the inner circumferential surface of the blank hollow cylindrical portion and in the axial direction.

According to an eighth aspect of the present invention, the radially expanding the blank hollow cylindrical portion includes holding an outer circumferential surface of the blank hollow cylindrical portion with a holding mold which is dividable into a plurality of blocks in the circumferential direction.

According to a ninth aspect of the present invention, the radially expanding the blank hollow cylindrical portion further includes setting a temperature of the blank hollow cylindrical portion higher than a temperature of a portion other than the blank hollow cylindrical portion.

Another aspects and advantages of the present invention will be apparent from the following description, the drawings, and the claims.

BEST MODE FOR CARRYING OUT THE INVENTION

Hereinafter, embodiments of the present invention will be described in detail with reference to the drawings.

Figure 5:
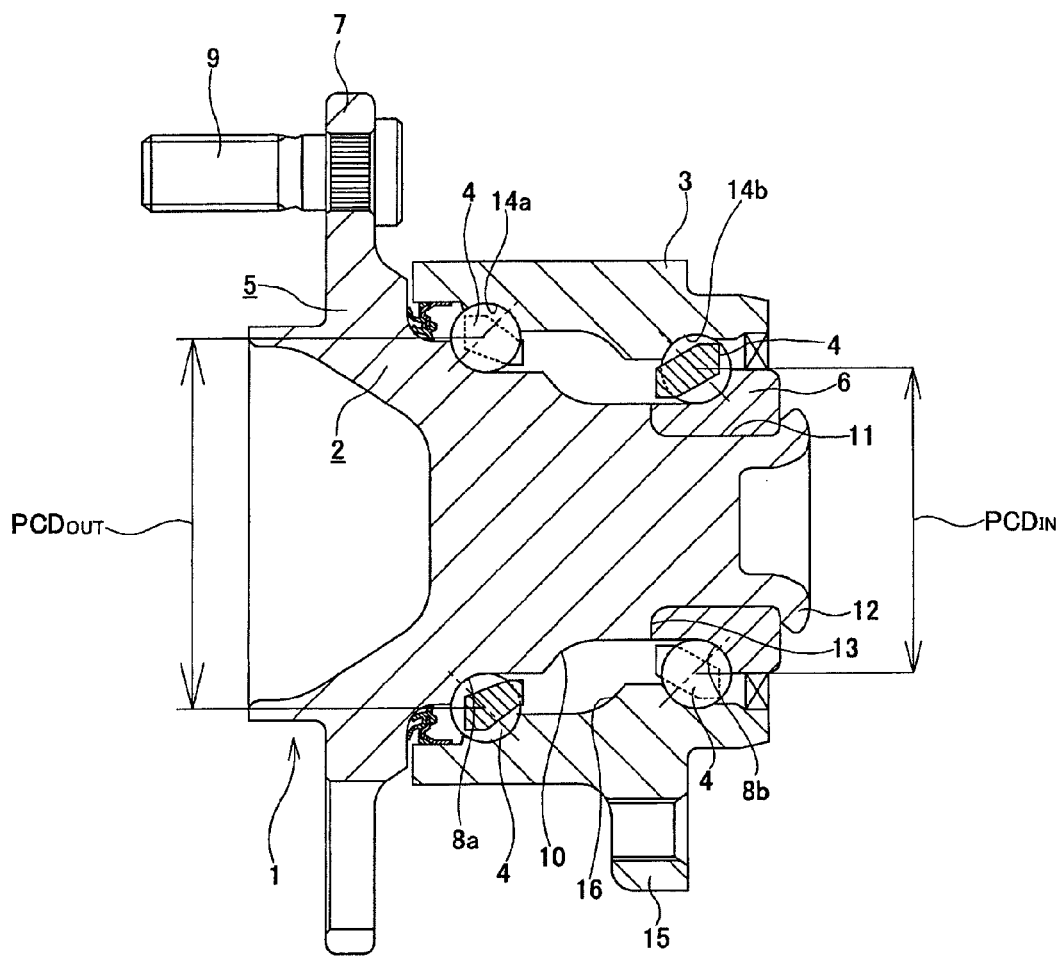
FIG. 5 is a sectional view of a first example of a rolling bearing unit for a vehicle, which incorporates an outer ring to be manufactured by the method according to the embodiments of the present invention.
Figure 6:
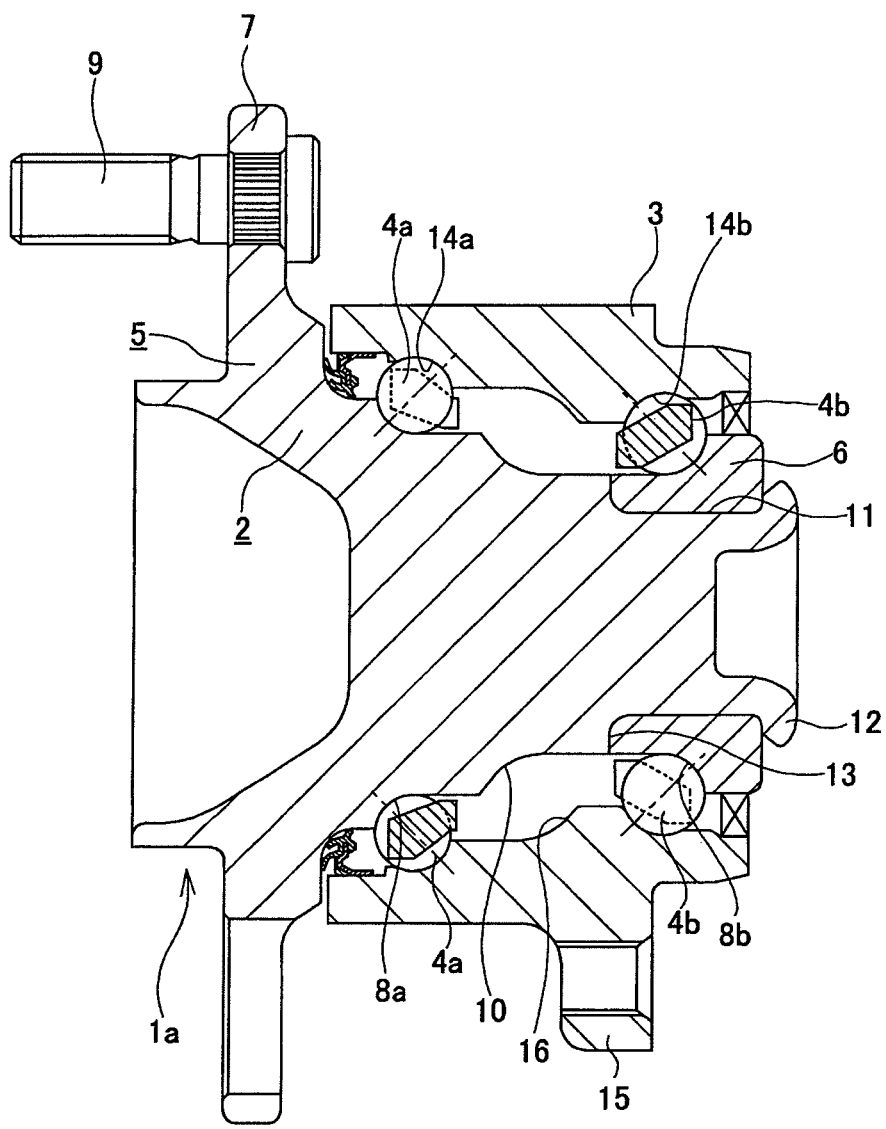
FIG. 6 is a sectional view of a second example of a rolling bearing unit for a vehicle, which incorporates an outer ring to be manufactured by the method according to the embodiments of the present invention.

In the following embodiments, an outer ring 3 like the one shown in FIG. 5 or 6, in which a diameter of an outer ring raceway 14a on an axially outer side is larger than a diameter of an outer ring raceway 14b on an axially inner side, is manufactured by methods according to the present invention. The axially outer side denotes a lower side in (C) to (F) of FIG. 1 and in (C) to (F) of FIG. 4, and an upper side in (G) to (I) of FIG. 1, in (G) to (I) of FIG. 4 and in FIGS. 2 and 3. The axially inner side denotes an upper side in (C) to (F) of FIG. 1 and in (C) to (F) of FIG. 4, and a lower side in (G) to (I) of FIG. 1, in (G) to (I) in FIG. 4 and in FIGS. 2 and 3. An up-and-down direction in FIGS. 1 to 3 (and similarly in FIG. 4 which will be described later) coincides with an up-and-down direction during a machining operation.

First Embodiment

Figure 1:
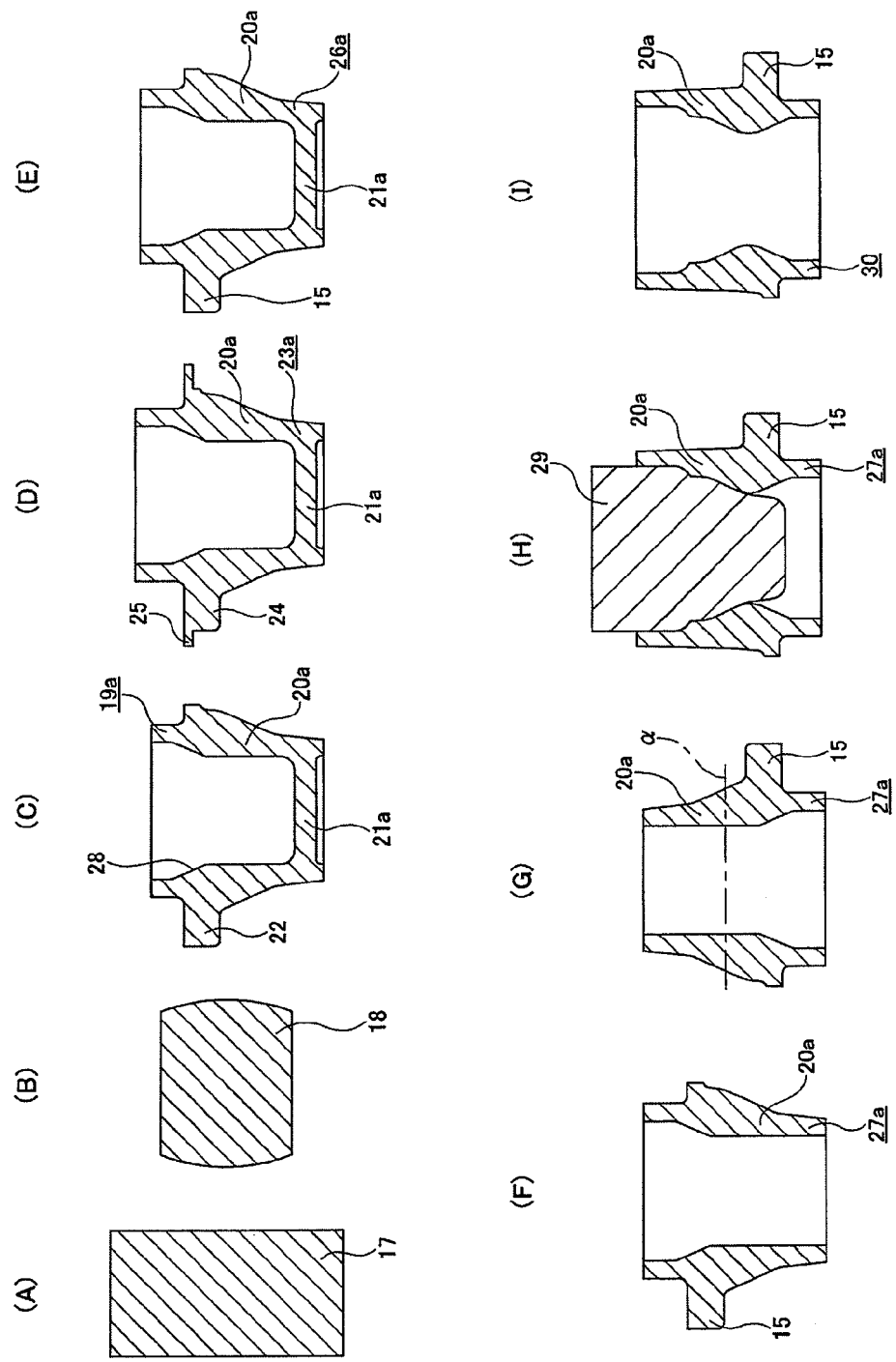
FIG. 1 is a sectional view showing a manufacturing method according to a first embodiment of the present invention in a sequence of steps.
Figure 2:
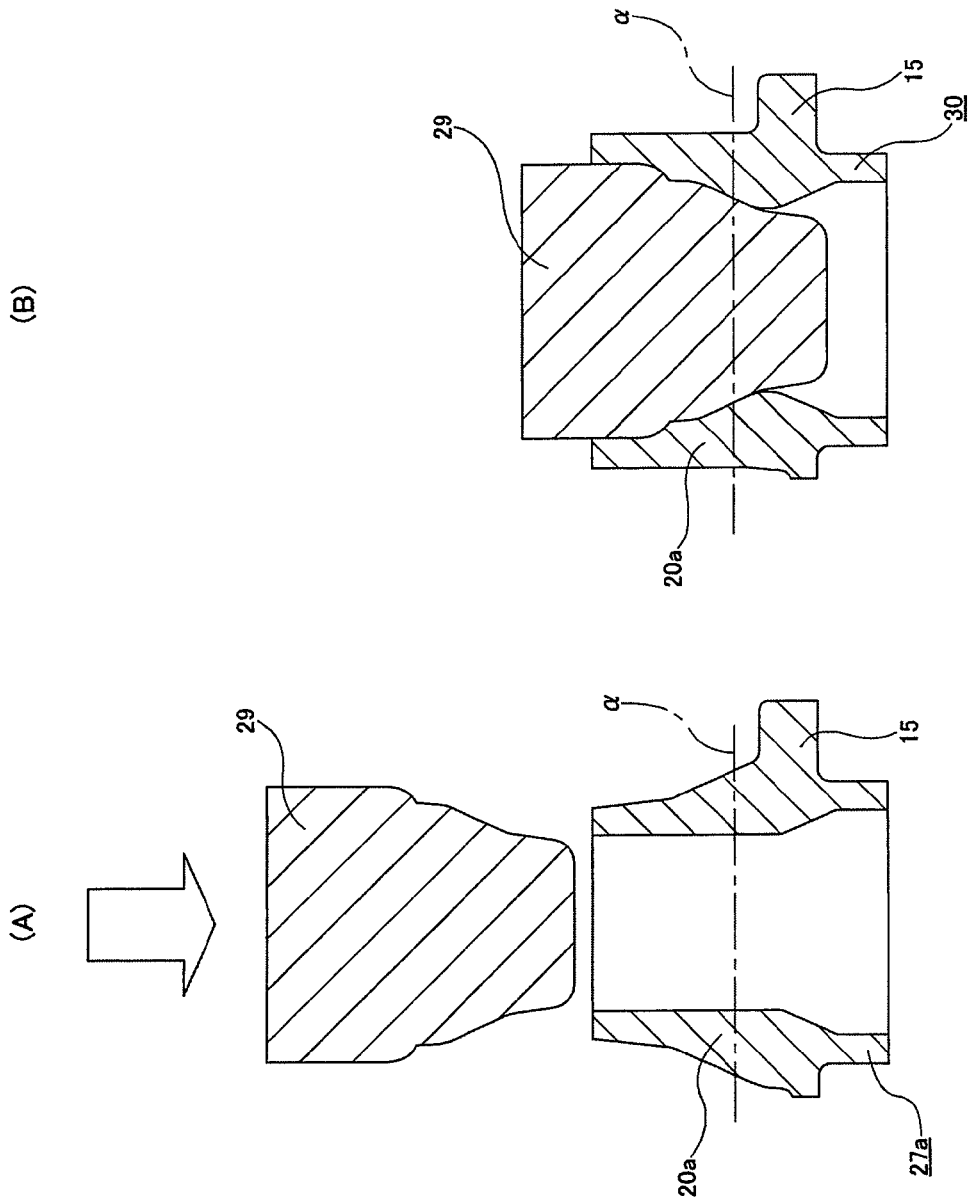
FIG. 2 is a sectional view showing a process of (G) to (H) in FIG. 1 in detail.
Figure 3:
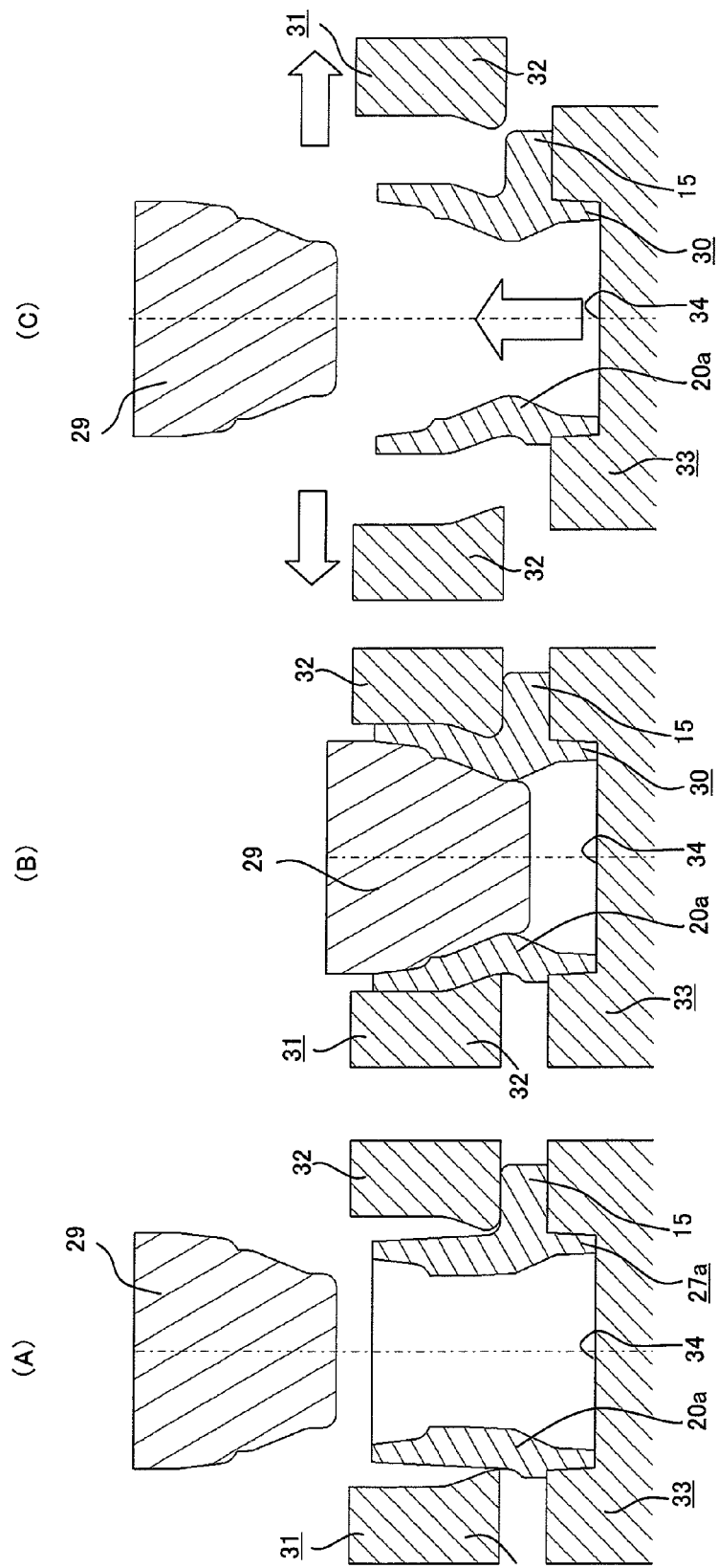
FIG. 3 is a sectional view showing a process of (G) to (H) in FIG. 1 in more detail.

FIGS. 1 to 3 show a first embodiment of the present invention.

Figure 7:
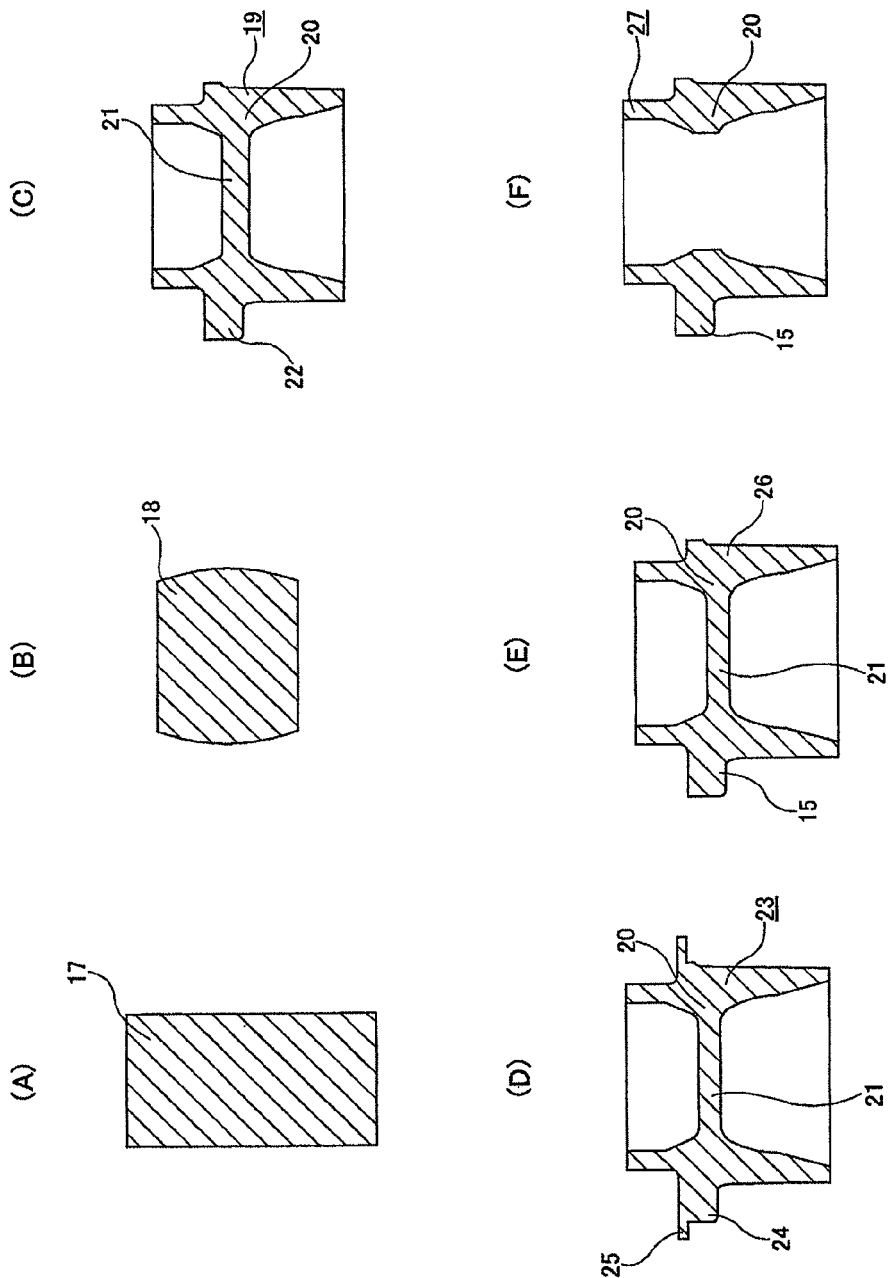
FIG. 7 is a sectional view showing a general manufacturing method of an outer ring of a wheel supporting rolling bearing unit in a sequence of steps.

According to a manufacturing method of the first embodiment, firstly, an upset process is carried out in which a solid cylindrical stock 17 shown in (A) of FIG. 1 is flattened in an axial direction to expand a diameter thereof, whereby an a primary intermediate work 18 having a beer barrel shape as shown in (B) of FIG. 1 is formed. This process is similar to the process of (A) to (B) in FIG. 7, and may be hot, worm or cold forming.

Thereafter, a plastic forming (a hot forging) is carried out on the primary intermediate work 18 inside a mold unit having a die, a punch and a counter punch. A cavity of the die, the punch, and the counter punch are disposed concentrically with each other. The cavity has a desired inner surface configuration, that is, the inner surface configuration that matches an outer surface configuration of a preliminary secondary intermediate work 19a to be obtained. To carry out the plastic forming, firstly, the punch is retracted from an interior of the cavity, and the primary intermediate work 18 is set inside the cavity so as to be concentric with the cavity. In this state, an axial end face (a lower end face) of the primary intermediate work 18 abuts against a distal end face (an upper end face) of the counter punch. Next, the punch is caused to enter the interior of the cavity, so as to cause a distal end face (a lower end face) of the punch to abut against the other axial end face (an upper end face) of the primary intermediate work 18.

Outside diameters of the punch and the counter punch are smaller than an inside diameter of the cavity by an amount corresponding to a radial thickness of a cylindrical wall 20a (see (C) of FIG. 1) of the preliminary secondary intermediate work 19a to be obtained, and are smaller than outside diameters of the axial end portions of the primary intermediate work 18. Further, an axial end face of the die is located slightly lower than the distal end face of the counter punch. Consequently, when the distal end face of the punch is moved toward the distal end face of the counter punch such that a radially central portion of the primary intermediate work 18 is squashed between the distal end faces of the molds, the primary intermediate work 18 is deformed along outer surfaces of the molds and the inner surface of the cavity, whereby the preliminary secondary intermediate work 19a is obtained. This preliminary secondary intermediate work 19a includes the cylindrical wall 20a, a partitioning portion 21a which closes an inside of the cylindrical wall 20a at a portion lying closer to an axial end portion of the cylindrical wall 20a, and a blank flange portion 22 provided on an outer circumferential surface of the cylindrical wall 20a at an axially intermediate portion thereof to become a coupling flange 15. In accordance with the outer circumferential surface configuration of the punch, an inner circumferential surface configuration of the cylindrical wall 20a has a stepped cylindrical surface shape which includes a sloping stepped portion 28 at a portion lying near the opening. On this sloping stepped portion 28, an outer ring raceway 14b on an axially inner side is formed in the later stage.

As described above, the partitioning portion 21a of the preliminary secondary intermediate work 19a is formed in the axial end portion of the cylindrical wall 20a, which is forwardly off-centered in a direction in which the punch is pushed in. An axial length of a portion, which is formed by the forward extrusion to protrude further forward than the partitioning portion 21a in the push-in direction of the punch, is very short. That is, most of the cylindrical wall 20a is formed by a backward extrusion in which extrusion resistance is relatively small, and a proportion of the portion formed by the forward extrusion in which the extrusion resistance is large is very small. Accordingly, a load required for producing the preliminary secondary intermediate work 19a is smaller as compared with the load required for producing the preliminary secondary intermediate work 19 shown in (C) of FIG. 7. As a result of this, dimensions of a pressing apparatus, such as a hydraulic cylinder, installed in a forging system for manufacturing can be made small to downsize the forging system, to reduce operation cost, and further, to reduce machining time.

Through a finishing forming process in which the preliminary secondary intermediate work 19a is plastically deformed in another mold unit having another punch and another counter punch, a subsequent preliminary secondary intermediate work 23a shown in (D) of FIG. 1 is obtained. In the step of processing the preliminary secondary intermediate work 19a into the subsequent preliminary secondary intermediate work 23a, an overall shape is arranged by reducing thicknesses of the partitioning portion 21a and the blank flange portion 22 while increasing an axial dimension of the cylindrical wall 20a. On an outer circumferential edge of a secondary blank flange portion 24 of the subsequent preliminary secondary intermediate work 23a, a burr 25 is formed as a result of the residual material. Thus, the burr 25 is removed to obtain a secondary intermediate work 26a shown in (E) of FIG. 1, and the secondary blank flange portion 24 becomes the coupling flange 15.

Next, a punching is carried out on the secondary intermediate work 26a to remove the partitioning portion 21a, whereby a tertiary intermediate work 27a shown in (F) of FIG. 1 is obtained. An axially outer half portion (a lower half portion in (F) of FIG. 1) of the cylindrical wall 20a of the tertiary intermediate work 27a corresponds to a blank hollow cylindrical portion, which is to be subjected to a radial expansion.

Next, the axially outer half portion (the blank hollow cylindrical portion) of the tertiary intermediate work 27a having an inner circumferential surface where a large diameter outer ring raceway 14a (see FIGS. 5 and 6) is to be formed, is radially expanded. Firstly, as shown in (F) to (G) of FIG. 1, the tertiary intermediate work 27a is turned upside down, so that a punch 29, which is adapted to be pressed downward by a ram of a press machine, can be pushed into the axially outer half portion of the tertiary intermediate work 27a as shown in (H) of FIG. 1. Further, with the tertiary intermediate work 27a being turned upside down, the temperature of the axially outer half portion is set high, while the temperature of an axially inner half portion is set low. The reason for this is to facilitate the radial expansion of the axially outer half portion by the pushing-in of the punch 29, and at the same time, to prevent an adverse plastic deformation of the axially inner half portion from being generated in association with the pushing-in of the punch 29. In other words, while sufficiently lowering the rigidity (softening) of the axially outer half portion, at the same time, the rigidity of the axially inner half portion is made sufficiently high (kept hard).

In order to set the temperature of the axially outer half portion high and to set the temperature of the axially inner half portion low as described above, at least one of the following methods (1) and (2) is adopted, taking into consideration a relationship with other steps.

(1) Heating the axially outer half portion, i.e., a portion above a chain line a in (G) of FIG. 1 and in FIG. 2.

This method (1) is adopted in a case where a time required after producing the tertiary intermediate work 27a shown in (F) of FIG. 1 until the radially expanding operation by the punch 29 shown in (H) of FIG. 1 is carried out is long, so the temperature of the axially outer half portion is lowered to such an extent that the radially expanding operation cannot stably be carried out. A heating method is not particularly limited, however, a high-frequency induction heating method is suitable from the point of view that the heating can be carried out with a simple equipment and in a short time.

(2) Cooling the axially inner half portion, i.e., a portion below the chain line a in (G) of FIG. 1 and in FIG. 2.

This method (2) is adopted in a case where a time required after producing the tertiary intermediate work 27a shown in (F) of FIG. 1 until the radially expanding operation by the punch 29 shown in (H) of FIG. 1 is carried out is short, so the temperature of the axially outer half portion can be maintained to such an extent that the radially expanding operation can stably be carried out. A cooling method is not particularly limited, however, a method of blowing a cold air that is cooled in a refrigeration machine onto the axially inner half portion is suitable in the point of view that the cooling can be carried out with simple equipment and without contaminating the tertiary intermediate work 27a. In this case, it is preferable that a partition is placed at the portion of the chain line a so that the cold air is prevented from reaching the axially outer half portion.

Further, the methods (1) and (2) may be adopted in combination to ensure the facilitation of the radial expansion of the axially outer half portion and the prevention of the plastic deformation of the axially inner half portion.

Once the temperature of the axially outer half portion of the tertiary intermediate work 27a is set high and the temperature of the axially inner half portion of the tertiary intermediate work 27a is set low in a state in which the axially outer half portion of the tertiary intermediate work 27a is upwardly oriented as described above, the punch 29 is pushed into the axially outer half portion to radially expand the axially outer half portion. In this radially expanding operation, the punch 29 is moved down by the press machine in a state in which the punch 29 and the tertiary intermediate work 27a are disposed concentrically with each other as shown in (A) of FIG. 2, and the punch 29 is pushed into the axially outer half portion as is shown in (H) of FIG. 1 and in (B) of FIG. 2. As a result, a diameter of the axially outer half portion is expanded, and at the same time, a configuration of an outer circumferential surface of the punch 29 is transferred on to an inner circumferential surface of the axially outer half portion, whereby a quaternary intermediate work 30 shown in (I) of FIG. 1 is obtained. An axially outer half portion of this quaternary intermediate work 30 corresponds to a hollow cylindrical portion where the outer ring raceway 14a on the axially outer side is formed.

In order to stably carry out the radially expanding operation described above, it is preferable that the radially expanding operation be carried out in a way shown in FIG. 3. That is, in order to obtain the quaternary intermediate work 30 in good quality, it is necessary that the diameter of the axially outer half portion is controlled to have a desired value after the radial expansion, and that the configuration of the outer circumferential surface of the punch 29 is reliably transferred onto the inner circumferential surface of the axially outer half portion. In view of this, it is preferable that the punch 29 is pushed into the axially outer half portion while holding the outer circumferential surface of the axially outer half portion with a holding mold 31. Further, it is preferable that the holding mold 31 be configured such that the outer circumferential surface of the axially outer half portion is reliably held, that is, is held along the entire circumference and along the entire length so as not to be excessively displaced outward in the radial direction, and such that it can easily be attached to and detached from the perimeter of the axially outer half portion.

In view of above, the radially expanding device shown in FIG. 3 is configured such that, when radially expanding the axially outer half portion (the blank hollow cylindrical portion) of the tertiary intermediate work 27a, the outer circumferential surface of the axially outer half portion is held by the holding mold 31, which is divided into a plurality of sections in a circumferential direction. The holding mold 31 includes a plurality (e.g., two or three) of holding blocks 32, each of which having a partially cylindrical shape. Each of the holding blocks 32 is movable back and forth along the radial direction of the tertiary intermediate work 27a by an actuator, which can ensure a large supporting rigidity, such as a hydraulic cylinder or a feed screw device. It is designed that, when the respective holding blocks 32 are displaced to be in radially innermost positions such that their end faces in the circumferential direction abut against each other, the holding mold 31 is configured to have a cylindrical shape having an inside diameter that substantially coincides with the aforesaid desired value (that controls the diameter of the axially outer half portion to be the desired value in consideration of spring back).

The radially expanding operation of processing the tertiary intermediate work 27a into the quaternary intermediate work 30 is carried out in a way described below, using the holding mold 31 described above. Firstly, as shown in (A) of FIG. 3, the tertiary intermediate work 27a is placed on a receiving base 33. More specifically, a portion of the tertiary intermediate work 27a, which protrudes further axially inward than the coupling flange 15, is fitted into a recessed hole 34 formed in an upper portion of the receiving base 33, and an axially inner surface of the coupling flange 15 is brought into contact with an upper surface of the receiving base 33. At this stage, the holding blocks 32 are retracted respectively in a direction in which they are moved away from each other. Next, the holding blocks 32 are displaced toward the axially outer half portion of the tertiary intermediate work 27a, respectively, so that the end faces of the respective holding blocks 32, 32 in the circumferential direction are brought into contact with each other. In this state, the holding mold 31 is disposed concentrically with the tertiary intermediate work 27a and around the perimeter of the axially outer half portion of the tertiary intermediate work 27a.

Then, as is shown in (A) to (B) of FIG. 3, the punch 29 is moved down and is pushed into the axially outer half portion of the tertiary intermediate work 27a. As a result of this, the axially outer half portion is radially expanded, and at the same time, the configuration of the outer circumferential surface of the punch 29 is transferred onto the inner circumferential surface of the axially outer half portion, whereby the quaternary intermediate work 30 shown in (I) of FIG. 1 is obtained.

Next, as shown in (C) of FIG. 3, after moving the punch 29 upward so as to be pulled out from the quaternary intermediate work 30, the holding blocks 32, 32 are retracted respectively in the direction in which they are moved away from each other, and then, the quaternary intermediate work 30 is removed.

By radially expanding the axially outer half portion of the tertiary intermediate work 27a in the way described above, the quaternary intermediate work 30 is obtained with excellent configuration accuracy and dimension accuracy. During the radially expanding operation, it is also possible to transfer a configuration of the inner circumferential surface of the holding mold 31 (an optional configuration such as indented configuration of a code representing a model number) onto the axially outer half portion.

In the first embodiment, a lower portion on the inner circumferential surface of each of the holding blocks 32 is protruded inward in the radial direction. During the radially expanding operation, this protruded lower portion on the inner circumferential surface of each of the holding blocks 32 presses a part of the axially outer half portion of the tertiary intermediate work 27a, which lies adjacent to the coupling flange 15 on an axially outer side, inwardly in the radial direction, i.e., toward the outer circumferential surface of the punch 29, whereby the thickness of the aforesaid part is reduced. In this way, in accordance with the configuration of the inner circumferential surface of the holding mold 31, the weight of the axially outer half portion of the tertiary intermediate work 27a can be partially trimmed.

The quaternary intermediate work 30 that is removed from the receiving base 33 is fed to a subsequent finishing step, where the double rows of outer ring raceways 14a, 14b (see FIGS. 5 and 6) are formed on the inner circumferential surface of the quaternary intermediate work 30 by shaping, such as turning, and finishing, such as grinding.

Second Embodiment

Figure 4:
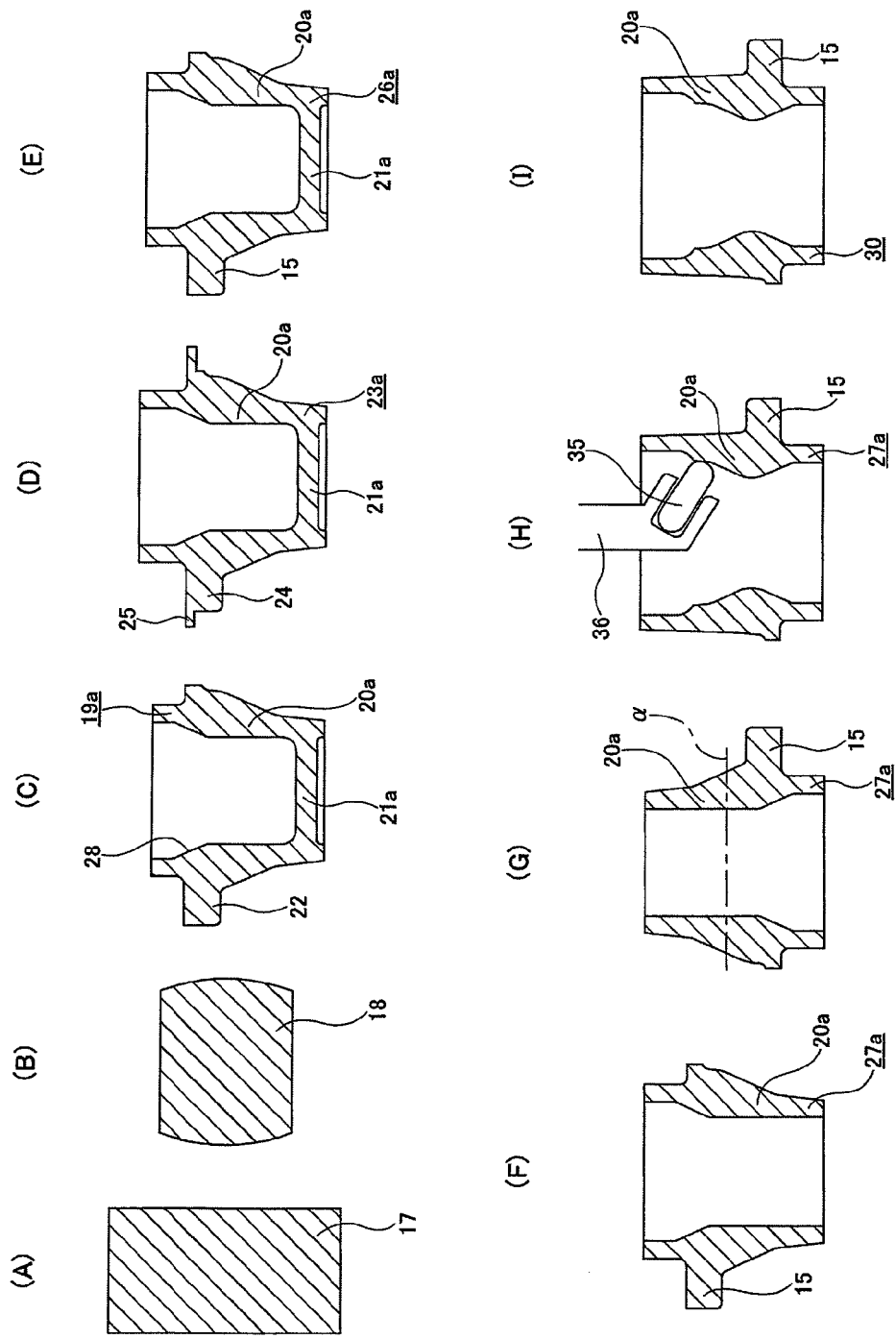
FIG. 4 is a sectional view showing a manufacturing method according to a second embodiment of the present invention in a sequence of steps.

FIG. 4 shows a method according to a second embodiment of the present invention. In the first embodiment, the punch 29 which moves in the axial direction is used to obtain the quaternary intermediate work 30 by radially expanding the axially outer half portion of the tertiary intermediate work 27*a*. In the second embodiment, as shown in (H) of FIG. 4, the axially outer half portion of the tertiary intermediate work 27*a* is radially expanded by using a roller 35. More specifically, an outer circumferential surface of the roller 35, which is supported rotatably at a distal end portion of a presser arm 36, is strongly pressed against the inner circumferential surface of the axially outer half portion of the tertiary intermediate work 27*a*, and the roller 35 and the tertiary intermediate work 27*a* are relatively rotated. In addition, by relatively displacing the tertiary intermediate work 27*a* and the presser arm 36 in the axial direction, a rolling contact portion between the inner circumferential surface of the axially outer half portion of the tertiary intermediate work 27*a* and the outer circumferential surface of the roller 35 is moved circumferentially and axially on the inner circumferential surface of the axially outer half portion. By this operation, the axially outer half portion is radially expanded, whereby a quaternary intermediate work 30 is obtained. When carrying out the radially expanding operation like this, the outer circumferential surface of the axially outer half portion of the tertiary intermediate work 27*a* is held by a holding mold like the holding mold 31 of the first embodiment. Since the configurations and functions of the other portions are similar to those of the first embodiment, the description of the similar portions will be omitted.

According to the methods of the embodiments described above, the outer ring 3, in which pitch circle diameters of balls 4 (4*a*, 4*b*) arranged in double rows are different from each other, can be manufactured with a good yield rate of material and in a short machining time. Consequently, manufacturing cost of the outer ring 3, and hence, a rolling bearing unit incorporating the outer ring 3 can be reduced.

That is, the axially outer half portion (the hollow cylindrical portion) of the quaternary intermediate work 30, where the outer ring raceway 14*a* for the row of balls having the larger pitch circle diameter is provided, is manufactured by radially expanding the axially outer half portion of the tertiary intermediate work 27*a* which is smaller in diameter than the axially outer half portion of the quaternary intermediate work 30. Therefore, by adjusting the level of radial expansion, the diameter of the outer ring raceway 14*a* can be adjusted optionally. In addition, the configuration of a portion which lies adjacent to the outer ring raceway 14*a* with respect to the axial direction can also be processed into an optional configuration during the radially expanding operation, in accordance with the outer circumferential surface of the punch 29 in the first embodiment or the movement of the roller 35 in the second embodiment.

Consequently, the partitioning portion 21*a*, which is to be formed in the preliminary secondary intermediate work 19*a* shown in (C) of FIG. 1 and (C) of FIG. 4 so as to correspond to the abutting portion between the counter punch and the punch, i.e., the portion between the distal end faces of the molds at the time when the counter punch and the punch are moved to be closest to each other, can be formed not only at the position between the outer ring raceways but also at an optional position, e.g., at the axially end portion of the preliminary secondary intermediate work 19*a*. Accordingly, most of the cylindrical wall 20*a* of the preliminary secondary intermediate work 19*a* is formed by the backward extrusion. In other words, the amount to be processed by the forward extrusion, which is disadvantageous from the viewpoint of reducing the manufacturing cost for the reason described before, can be made very small (or zero).

In addition, because the inside diameter of the axially outer half portion of the quaternary intermediate work 30 can be approximated to the inside diameter of the axial outer half portion of the outer ring 3, an amount to be cut in the finishing process for making the outer ring raceway 14*a* have desired dimensions and properties is suppressed to be small, whereby the yield rate of material is improved and the machining time is shortened to reduce manufacturing cost.

In the embodiments described above, the cases where the outer ring of the wheel supporting rolling bearing unit, in which the diameter of the outer ring raceway on the axially outer side is larger than the diameter of the outer ring raceway on the axially inner side, is manufactured by the methods according to the present invention are described. However, the methods according to the present invention are also applicable in a case of manufacturing an outer ring of a rolling bearing unit other than the wheel supporting rolling bearing unit. Further, the methods according to the present invention are also applicable in a case of manufacturing an outer ring having double rows of outer ring raceways whose diameters are the same. Furthermore, in a case where a punch having a thin distal end portion is used in the process of (B) to (C) in FIG. 1 to suppress the processing load to be small but a diameter of an outer ring raceway on the smaller diameter side is too small without any further process, the methods according to the present invention are also applicable in forming this outer ring raceway on the smaller diameter side. Moreover, the methods according to the present invention are also applicable for an inner ring on which inner ring raceways are formed along the entire circumference of an outer circumferential surface of a cylindrical portion thereof.

While the embodiments of the present invention have been described above, it is apparent for those skilled in the art that various changes and modification may be made therein without departing form the sprit and scope of the present invention.

The present application is based on Japanese Patent Application No. 2007-258632 filed on Oct. 2, 2007, the content of which is incorporated herein by reference.

The invention claimed is:

1. A method of manufacturing an outer ring of a double-row angular contact rolling bearing unit, the outer ring comprising double rows of raceway surfaces on an inner circumferential surface thereof, wherein inside diameters of the double rows of raceway surfaces are different from each other, the method comprising:

forming a barrel-shaped primary intermediate work by flattening a cylindrical stock in an axial direction;

forming a secondary intermediate work having a cylindrical wall, a partitioning portion which closes an inside of the cylindrical wall at an axial end portion of the secondary intermediate work, and a coupling flange outwardly protruding from an axially intermediate portion of an outer circumferential surface of the cylindrical wall, by plastically deforming the primary intermediate work inside a mold unit having a punch and a counter punch; and forming a tertiary intermediate work by removing the partitioning portion from the secondary intermediate work, a part of the tertiary intermediate work which lies on one side of the coupling flange in the axial direction and including a portion of the tertiary intermediate work from which the partitioning portion is removed being a blank hollow cylindrical portion;

radially expanding an inside diameter and an outside diameter of the blank hollow cylindrical portion to form a hollow cylindrical portion by pushing another punch into the blank hollow cylindrical portion such that an outside diameter of the hollow cylindrical portion is larger at an axial end of the hollow cylindrical portion than at a location adjacent to the coupling flange to provide a flared shape; and forming one of the double rows of raceway surfaces having the larger inside diameter on an inner circumferential surface of the hollow cylindrical portion along a circumferential direction thereof such that the coupling flange is positioned between the double rows of raceway surfaces in the axial direction.

2. The method according to claim 1, wherein the radially expanding the blank hollow cylindrical portion comprises:

pressing a roller against the inner circumferential surface of the blank hollow cylindrical portion; and moving a contact portion between the inner circumferential surface of the blank hollow cylindrical portion and the roller in the circumferential direction of the inner circumferential surface of the blank hollow cylindrical portion and in the axial direction.

3. The method according to claim 1, wherein the radially expanding the blank hollow cylindrical portion comprises holding an outer circumferential surface of the blank hollow cylindrical portion with a holding mold which is dividable into a plurality of blocks in the circumferential direction.

4. The method according to claim 1, wherein the radially expanding the blank hollow cylindrical portion comprises setting a temperature of the blank hollow cylindrical portion higher than a temperature of a portion other than the blank hollow cylindrical portion.

5. The method according to claim 4, wherein the radially expanding the blank hollow cylindrical portion comprises holding an outer circumferential surface of the blank hollow cylindrical portion with a holding mold which is dividable into a plurality of blocks in the circumferential direction.

* * * * *